(12) United States Patent
Husen et al.

(10) Patent No.: US 12,479,656 B2
(45) Date of Patent: *Nov. 25, 2025

(54) RECYCLABLE DETECTION AND IDENTIFICATION SYSTEM FOR RECYCLING COLLECTION VEHICLES

(71) Applicant: Orange Recycling, Inc., Orinda, CA (US)

(72) Inventors: David Husen, Austin, TX (US); Daniel Wintz, San Francisco, CA (US); Miles Price, Canyon, CA (US); Alex Woolf, Orinda, CA (US); Jesse Tootell, San Francisco, CA (US)

(73) Assignee: Orange Recycling, Inc., Orinda, CA (US)

( * ) Notice: Subject to any disclaimer, the term of this patent is extended or adjusted under 35 U.S.C. 154(b) by 65 days.

This patent is subject to a terminal disclaimer.

(21) Appl. No.: 18/321,728

(22) Filed: May 22, 2023

(65) Prior Publication Data

US 2024/0017916 A1    Jan. 18, 2024

Related U.S. Application Data

(63) Continuation of application No. 17/542,349, filed on Dec. 3, 2021, now Pat. No. 11,661,273.

(Continued)

(51) Int. Cl.
*G06V 20/56* (2022.01)
*B65F 3/00* (2006.01)
(Continued)

(52) U.S. Cl.
CPC ............ *B65F 3/00* (2013.01); *G01C 21/3602* (2013.01); *G06N 20/00* (2019.01); *G06V 10/25* (2022.01);
(Continued)

(58) Field of Classification Search
CPC .. B65F 3/00; B65F 2210/128; B65F 2210/138; G06N 20/00; G06V 10/25;
(Continued)

(56) References Cited

U.S. PATENT DOCUMENTS 8,813,972 B1 * 8/2014 Centers ..................... B07C 5/00
209/555
2007/0219862 A1 * 9/2007 Casella .............. G06Q 30/0215
705/14.17

(Continued)

FOREIGN PATENT DOCUMENTS

CN    109956237 A    7/2019
CN    110245560 A    9/2019
(Continued)

OTHER PUBLICATIONS

Awe, O., et al., "Final Report: Smart Trash Net: Waste Localization and Classification", pp. 1-6 (Dec. 15, 2017).
(Continued)

*Primary Examiner* — Carol W Chan

(57) ABSTRACT

Recyclable identification systems and methods are disclosed. A recyclable identification system, for example, may include a collection vehicle having a container and an imaging system disposed on the collection vehicle and positioned on the collection vehicle to image objects as the objects pass into the container. The recyclable identification system may also include a transceiver and a controller communicatively coupled with the imaging system and the transceiver. The controller may receive a plurality of images from the imaging system, the plurality of images includes images of objects that have been dumped into the container; determine a location associated with the plurality of images; combine the video or the plurality of images with the location; select an image or images of interest from frames (Continued)

of the plurality of images that include images of recyclables; and transmit the image of interest to a cloud computing system via the transceiver.

19 Claims, 11 Drawing Sheets

Related U.S. Application Data

(60) Provisional application No. 63/120,970, filed on Dec. 3, 2020.

(51) Int. Cl.
*G01C 21/36* (2006.01)
*G06N 20/00* (2019.01)
*G06V 10/25* (2022.01)
*G06V 10/44* (2022.01)
*G06V 10/70* (2022.01)
*G06V 20/40* (2022.01)

(52) U.S. Cl.
CPC .............. *G06V 10/44* (2022.01); *G06V 10/70* (2022.01); *G06V 20/46* (2022.01); *G06V 20/56* (2022.01); *B65F 2210/138* (2013.01)

(58) Field of Classification Search
CPC ........ G06V 10/44; G06V 10/70; G06V 20/46; G06V 20/56; G06V 20/52; G01C 21/3407; G01C 21/3602
See application file for complete search history.

(56) References Cited

U.S. PATENT DOCUMENTS

| | | | |
|---|---|---|---|
| 2014/0379588 A1* | 12/2014 | Gates .................... | G06T 7/0008 705/308 |
| 2019/0291139 A1* | 9/2019 | Centers .................... | B07B 9/02 |
| 2020/0034785 A1 | 1/2020 | Romano et al. | |
| 2022/0180330 A1* | 6/2022 | Dietrich .................... | B65F 3/02 |

FOREIGN PATENT DOCUMENTS

| | | | |
|---|---|---|---|
| CN | 110466913 A | | 11/2019 |
| JP | 2005182502 A | | 7/2005 |
| JP | 2007153488 A | * | 6/2007 |
| JP | 2010120736 A | * | 6/2010 |

OTHER PUBLICATIONS

Al-Masri, E., et al., "Recycle.io: An IoT-Enabled Framework for Urban Waste Management", 2018 IEEE International Conference on Big Data, pp. 5285-5287 (Dec. 2018).

Prajakta, G., et al., "Smart garbage collection system in residential area", Computer Science, International Journal of Research in Engineering and Technology, vol. 04, Issue. 03, pp. 122-124 (Mar. 25, 2015).

Notice of Allowance in U.S. Appl. No. 17/542,349 dated Mar. 1, 2023, 16 pages.

* cited by examiner

RECYCLABLE DETECTION AND IDENTIFICATION SYSTEM FOR RECYCLING COLLECTION VEHICLES

BACKGROUND

Recycling is the process of converting waste materials into new materials and objects. The collection of recyclable material from homes and offices happens nearly every day. The process of collecting, sorting, and distributing recyclables is both time consuming and expensive, which may lower the likelihood that a recyclable is actually recycled. In addition, the lower the quality of a bin of recyclables may also increase the overall sorting and recycling costs.

SUMMARY

Various recyclable identification and/or classification systems and methods are disclosed. A recyclable identification system, for example, may include a collection vehicle having a container and an imaging system disposed on the collection vehicle and positioned on the collection vehicle to image objects as the objects pass into the container. The recyclable identification system may also include a transceiver and a controller communicatively coupled with the imaging system and the transceiver. The controller may receive a plurality of images from the imaging system, the plurality of images includes images of objects that have been dumped into the container; determine a location associated with the plurality of images; combine the video or the plurality of images with the location; select an image of interest from frames of the plurality of images that include images of recyclables; and transmit the image of interest or metadata to a cloud computing system via the transceiver.

A system may include a collection vehicle having a container and imaging system positioned to image objects as the objects pass into the container, a transceiver, and a controller. The controller may receive a video or a plurality of images from the imaging system including the objects passing into or after being dumped into the container; determine a location associated with the video or the plurality of images; combine the video or the plurality of images with the location; select one or more images from frames of the video or from the plurality of images that include recyclables; and/transmit the one or more images to a cloud computing system via the transceiver.

The system may also include a GPS sensor and the location data comprises GPS data from the GPS sensor. The system may also include one or more flow control subsystems. The system may also include a proximity sensor and/or a metal detector.

An example method may include receiving one or more images of recyclables from a collection vehicle; identifying distinct objects from the one or more images; and classifying the distinct objects within the one or more images. In some embodiments, the method may also include detecting contamination within the recyclables based on the classification of distinct objects. In some embodiments, the method may also include determining a composition of the recyclables based on the classification of distinct objects. In some embodiments, the method may also include determining a route for a collection vehicle based at least in part on the classification of distinct objects. In some embodiments, classifying the distinct objects includes using a machine learning algorithm.

Another example may include a green waste identification system. The green waste identification system may include a collection vehicle having a container; an imaging system disposed on the collection vehicle and positioned on the collection vehicle to image objects as the objects pass into the container or once they have passed into the container; and a controller communicatively coupled with the imaging system and the transceiver. The controller may receive a plurality of images from the imaging system, the plurality of images includes images of objects that have been dumped into the container and determine a location associated with the plurality of images. The controller may also identify the boundaries distinct objects within the selected image; and classify one or more of the identified distinct objects bounded by the boundaries of distinct objects in the image as either green waste or a contaminant.

The controller, for example, may also determine a route for the collection vehicle based at least in part on the classification of the distinct objects.

The system may also include a metal detector in communication with the controller, and the controller may classify an object based on the detection of metal within an object using signals from the metal detector.

The various embodiments described in the summary and this document are provided not to limit or define the disclosure or the scope of the claims.

DETAILED DESCRIPTION

Systems and methods for collecting data about recyclables in or from a recycling bin or green waste bin, identifying objects in the bin, classifying objects received from within the bin, and process the data for various purposes are disclosed. The collected data may include images of the recyclables, location data, metadata, proximity data, object type data, etc. The collected data may be processed at a collection vehicle, in the cloud, or some combination of both. For instance, object identification and/or object classification may occur on the collection vehicle or in the cloud.

A user, for example, may take images of the recyclables prior to or when the recyclables are placed in a bin. These user may classify objects within the images and this classification may be used to train the classification system in the cloud.

While various examples and/or embodiments are described in conjunction with recyclables, these examples and/or embodiments may also apply to green waste.

Figure 1:
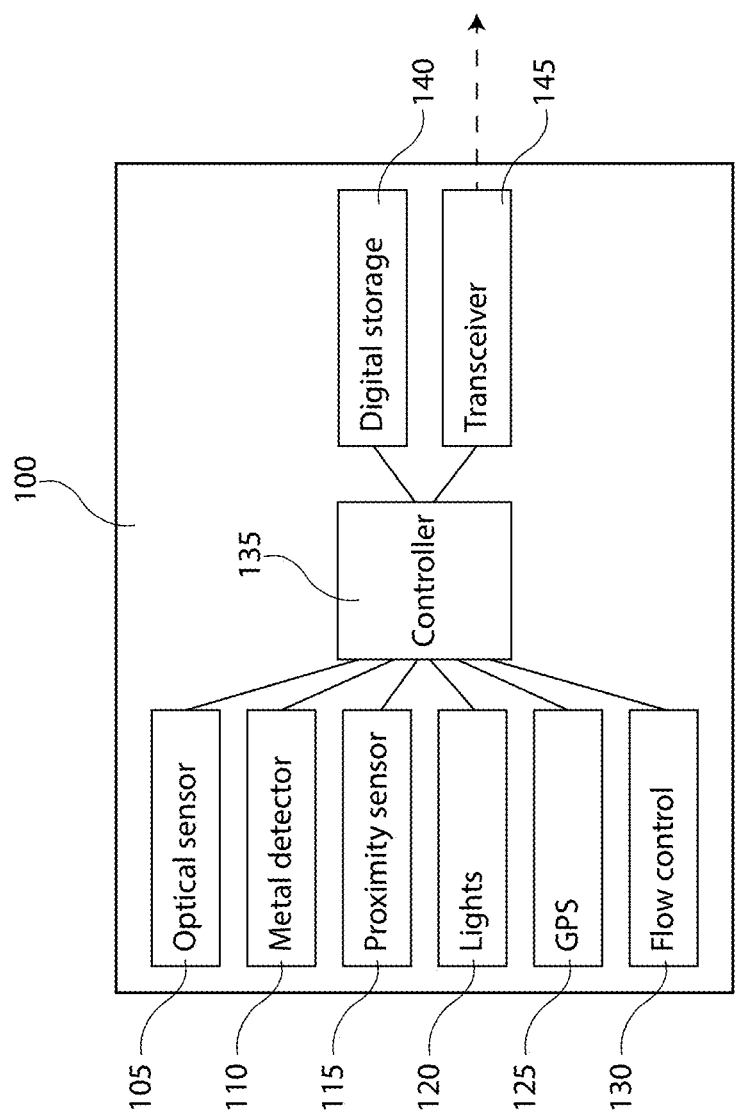
FIG. 1 is an example block diagram of a sensor system for a recycling collection system.

FIG. 1 is a block diagram of a collection vehicle 100 for a recycling or green waste collection system according to some embodiments. The collection vehicle 100, for example, may be placed on a recycling collection vehicle, a green waste collection vehicle, a garbage truck, etc. The collection vehicle 100, for example, may be placed in, near, or between conveyor belts, material recovery facilities, recycling bin, from bin to bin, in home recycling bin, a bucket, home bins, outdoor bins, personal recycling bin, mobile application, etc., etc. In some embodiments, the collection vehicle 100 may include an array of sensors such as, for example, an optical sensor 105, a metal detector 110, a proximity sensor 115, a GPS sensor 125, etc. In some embodiments, the collection vehicle 100 may include one or more lights 120 and/or a material flow control system 130. In some embodiments, the collection vehicle 100 may include a controller 135, digital storage 140, and/or a transceiver 145.

A material flow control system 130 may or may not be installed on every collection system.

The collection system, for example, may include one or more subsystems that grab a bin of recyclables or green waste and dump the contents into a container. The subsystem may include arms, actuators, gears, side loaders, rear loaders, front loaders, manual loaders, autonomous dumpers, etc. that engage with the bin, lift the bin, tilt the bin, rotate the bin, dump the bin, etc.

The optical sensor 105, for example, may include any type of optical imaging device such as, for example, a visual camera, IR camera, near infrared camera, mid-IR, etc. The optical sensor 105, for example, one or more optical sensors arranged in an array of optical sensors. The optical sensor 105, for example, may include optical sensors arranged to capture different angles of objects (e.g., recyclables, green waste, garbage, contaminants, etc.) as the objects are being dumped from the bin into the container, as the objects lay within the bin, and/or as the objects lay within the container after being dumped. The optical sensor 105, for example, may image the objects as the objects move through the flow control system 130, as the objects sit within a bin, or after the objects are dumped in a collection container. As another example, the optical system may image the objects within the bin or within the collection container. In some embodiments, the optical sensor 105 may collect video data, images, a plurality of images, etc.

The metal detector 110, for example, may include inductive sensors, beat frequency oscillators, very low frequency detectors, pulse induction, etc. The metal detector 110, for example, may detect metal in the objects as the objects move through the flow control system 130, as the objects sit within a bin, or after the objects are dumped in a collection container.

The proximity sensor 115, for example, may include a LIDAR sensor, an inductive sensor, a capacitive sensor, a photoelectric sensor, a photocell, radar sensor, sonar sensor, ultrasonic sensor, etc. The proximity sensor 115, for example, may image the objects as the objects move through the flow control system 130, as the objects sit within a bin, or after the objects are dumped in a collection container. The proximity sensor 115, for example, may provide 3D data about the objects.

The GPS sensor 125, for example, may include any type of geo-positioning sensor. The GPS sensor 125 may record GPS locations in the digital storage 140.

The lights 120, for example, may include any type of light such as, for example, LEDs. The lights 120, for example, may illuminate the objects as the objects move through the flow control system 130. The lights may be flicked on and off at a given frequency. The lights, for example, may be turned on when objects are sensed (e.g., by the proximity sensor 115). The lights, for example, may produce light within the visual spectrum, or the infrared spectrum, etc.

The flow control system 130, for example, may include one or more ramps, conveyors, gates, plates, guides, railings, surfaces, net, conveyors, guide plates, etc. that may allow the objects to be viewed and/or sensed while passing from a bin into the container, the objects lay within the bin, and/or the objects lay within the container after being dumped. The flow control system 130, for example, may force the objects to pass through a channel that is within the field of view of one or more sensors. The flow control system 130, for example, may decrease the depth of objects stacked one atop another. The flow control system 130, for example, may ensure that a single layer of object (not multiple layers of objects) is viewed or sensed by the sensors. The flow control system 130, for example, may spread the objects out so that objects are spread across a top layer of the collection container.

The flow control system, for example, may cut open bags and remove materials from containing bags to enable those materials to be imaged. The flow control system, for example, may include a blade or blades that may or may not be coupled with actuators. The blades, for example, may be used to cut through bags or containers. The actuators, for example, may be used to move the blades to allow more or less flow of materials.

Figure 10:
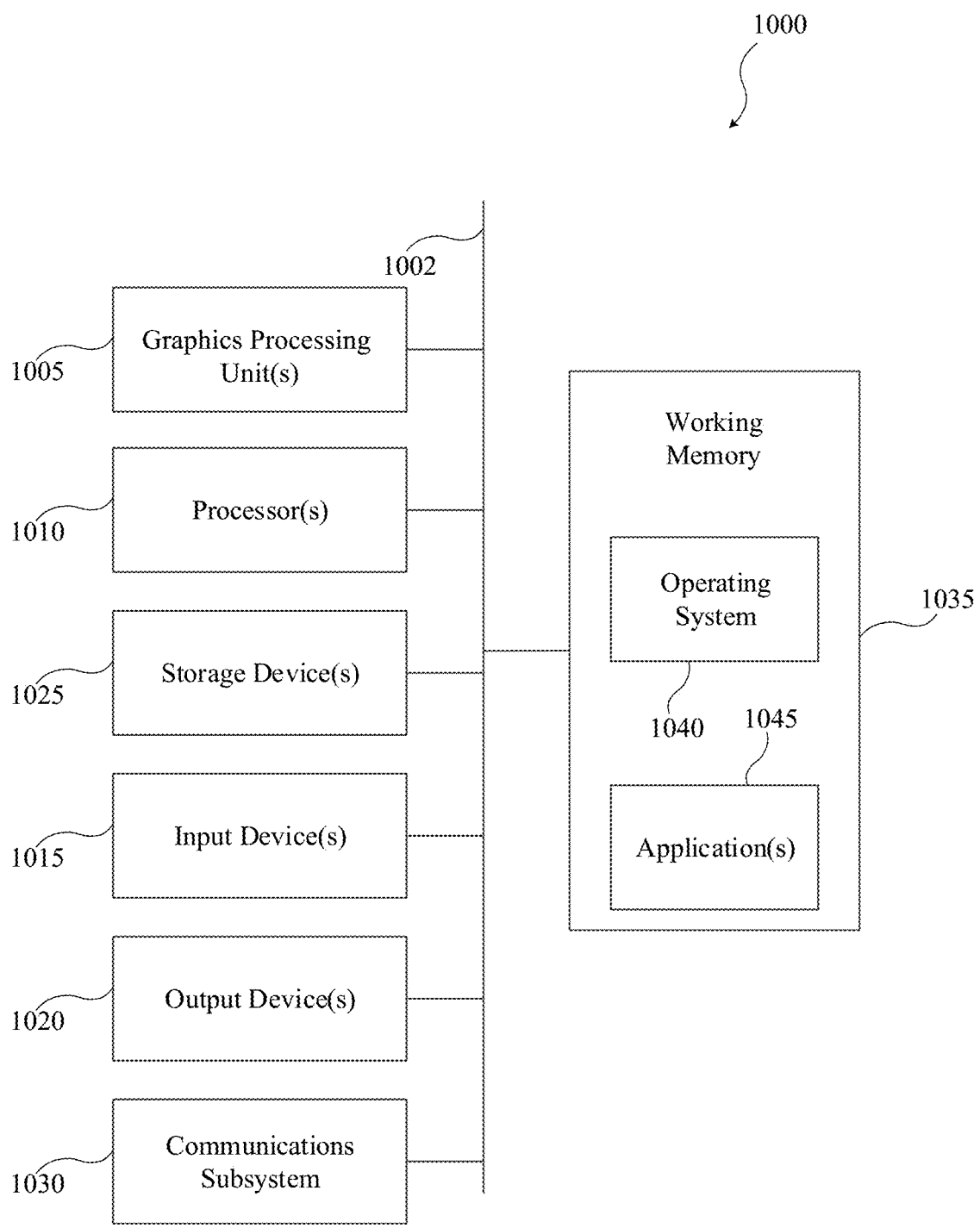
FIG. 10 is a block diagram of a computational system that can be used to with or to perform some embodiments described in this document.

The controller 135, for example, may include any type of processor such as, for example, all or portions of the computational system 1000, shown in FIG. 10. The controller 135, for example, may control the operation of the optical sensor 105, the metal detector 110, the proximity sensor 115, the lights 120, the GPS sensor 125, the flow control system 130, the digital storage 140, and/or the transceiver 145, etc. The controller 135 may include general computing capabilities such as, for example, the controller may include image processing, metadata processing, etc. The controller 135 may include specialized computing capabilities such as, for example, a GPU for running object detection, inference models, etc.

The digital storage 140, for example, may include the storage devices 1025 shown in FIG. 10.

The transceiver 145, for example, may include the communications subsystem 1030. In some embodiments, the transceiver 145 may communicate data stored in the digital storage 140 to a cloud storage location and/or a cloud processor such as, for example, cloud processor 200 shown in FIG. 2. The transceiver 145, for example, may include a Wi-Fi transceiver that may be used to transmit large data files. As another example, the transceiver 145 may include any type of wireless communication protocol known in the art (e.g., 4G LTE, 5G, LTE-M, NB-IoT, Bluetooth, etc.). As another example, the transceiver 145 may include a satellite transceiver.

In some embodiments, the optical sensor 105, the metal detector 110, the proximity sensor 115, and/or the GPS sensor 125 may record sensor data that is stored in the digital storage 140. In some embodiments, the sensor data may be communicated directly to the digital storage 140 and/or transferred to the digital storage 140 through the controller 135.

Various other sensors may be included such as, for example, RFID sensors, a camera, etc. that can read data from a given bin. The RFID sensor, for example, may read an RFID chip on the given bin that includes an identifier for the given bin. The camera, for example, may read a code, QR code, ID number, address, etc. on the given bin that identifies the given bin.

In some embodiments, the controller 135 may filter the data for various purposes. For example, the controller may select one or more still images from a video recording of a set of objects from a bin such as, for example, based on image focus, the number of objects in an image, image contrast, image brightness, and/or image sharpness. The one or more still images, for example, may be selected for each bin or each location or each stop. The number of images selected may depend on the number of objects in the bin, the size of the bin, the size of the flow control system 130, etc.

In some embodiments, the controller 135 may label data with metadata such as, for example, time of day, GPS data, bin identifier, address identifier, number of objects, number of contaminants, composition estimates, contamination estimates, classification confidence, etc.

In some embodiments, the controller 135 may compress data prior to transferring the data from the collection vehicle 100. In some embodiments, the controller 135 may transfer some data to the cloud processor 200 in soon after recording the data (e.g., in real time) such as, for example, via a low transfer rate wireless signal. For example, the controller 135 may transfer one or more images and/or some metadata to the cloud processor 200 as soon as the data prepared. The controller 135 may transfer raw sensor data at a later time such as, for example, when the collection vehicle 100 is near a Wi-Fi or another high transfer rate signal.

Figure 2:
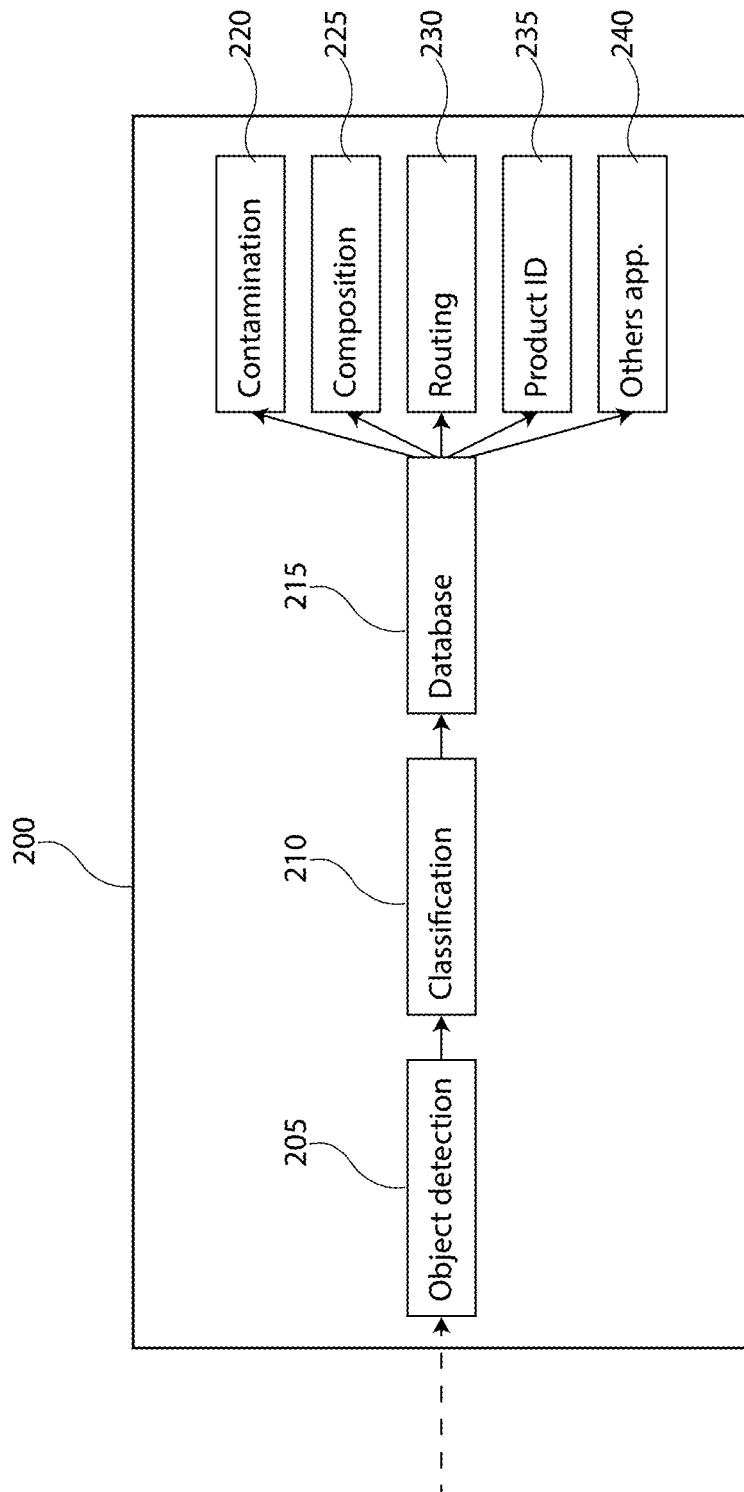
FIG. 2 is an example block diagram of a cloud processor.

FIG. 2 is a block diagram of a cloud processor 200 according to some embodiments. The cloud processor 200, for example, may receive various sensor data from the collection vehicle 100. The sensor data, for example, may be pre-processed, filtered, compressed, inserting metadata, combining data, etc. at the collection vehicle 100 prior to being sent to the cloud processor 200. At the cloud processor 200 the sensor data may be processed in a number of processes such as, for example, an object detection process 205 and an object classification process 210. After processing, the data may be stored in the recyclable dataset 215. The recyclable dataset may then be used for a number of uses such as, for example, contamination detection 220, composition analysis 225, route optimization 230, product identification 235, other applications 240, etc.

The object detection process 205 may identify different objects within the image of the objects. For example, the object classification process 210 may classify and/or identify objects shown in an image recorded by the optical sensor 105. The image may be analyzed to determine the boundary of various objects shown in the image. The object detection process 205 may use proximity data from the proximity sensor 115 to identify objects within the image. The object detection process 205 may, for example, return vectors of pixels that outline objects within the image. As another example, the object detection process 205 may create a pixel map that labels each pixel as a distinct object.

The object detection process 205, for example, may include the following. Finding all the interesting regions within each image based on edge detection gradients and/or matrices (e.g., using region proposal network); deciding which regions are interesting (e.g., region of interest alignment); putting a bounding box around the object within the image (e.g., Bounding Box proposal); etc.

For each object recognized in an image, for example, the object detection process may return two data points that define a rectangle surrounding the object. These data points may be stored with the dataset. or each object recognized in an image, for example, the object detection process may return a bounding mask and/or gradients.

The object classification process 210 may classify the identified objects within the image. For example, the objects may be classified as one or more of the following object types: metal, cardboard, paper, glass, tin, aluminum, garbage, food, contaminant, plastic, electronic device, battery, wood, PET, HDPE, PVC, LDPE, PP, PS, cloth, etc. The object classification process 210 may, for example, label vectors of pixels that outline objects within the image with an object type. As another example, the object classification process 210 may label each pixel with a label identifying the pixel associated with an object type. The object classification process 210 may include machine learning algorithms and/or artificial intelligence algorithms.

In some embodiments, the object classification process 210 may use machine learning algorithms to classify objects based on a learning dataset.

The recyclable dataset 215 may be created that attributes recyclable data to an address. The recyclable dataset 215, for example, may include a bin identifier (e.g., number, address, RFID code, etc.), one or more images, GPS data, and detected object data. The detected object data, for example, may for each object in an image include two points defining two corners of a rectangle surrounding each object, an object type, an object classification confidence score, etc. The recyclable dataset may include a contamination rate, etc.

In some embodiments, the recyclable dataset may be used for contamination detection 220. Contamination may include garbage, food, non-recyclables, hazardous material, batteries, diapers, plastic bags, zip top bags, heavily soiled paper, wax coated paper, shredded paper, Pyrex, ceramics, plastics that are not recyclable at the facility where the recyclables will be taken, strings, hoses, wire, light bulbs, LEDs, extension cords, plastic films, etc., etc. The contamination detection 220, for example, may identify contamination of recyclables for a given location or a given bin at a given time and/or over a period of time. The contamination detection 220, for example, may identify contamination for a given bin or given location.

As another example, contamination detection 220 may include calculating a contamination score for each bin of recyclables, for an address, and/or an aggregate recycling score for all the recyclables within a collection vehicle.

A contamination score, for example, may be calculated based on the total number of recyclables, the total number of contaminants, the frequency of contaminates, the contaminants processed at the service provider, etc. A contamination score, for example, may be prorated and/or may be based on an average for a neighborhood, city, truck route, service provider, etc. For example, a contaminate score may then be a function of the frequency of receiving a recycling bin with known contaminates. As another example, a given service provider may not recycle glass products; a contamination score may then be a function of the frequency of finding glass contaminates in the recycling bin. As another example, a contamination score may then be a function of the frequency of contaminants within recyclables.

As another example, contamination detection 220 may include calculating a recycling score for each bin of recyclables, for an address, and/or an aggregate recycling score for all the recyclables within a collection vehicle. A recycling score, for example, may be calculated based on the total number of recyclables, the total number of contaminants, the frequency of contaminates, the contaminants processed at the service provider, etc. A recycling score, for example, may be prorated and/or may be based on an average for a neighborhood, city, truck route, service provider, etc. For example, a given service provider may not recycle glass products; a recycling score may then be a function of the frequency of recycling or the amount of recycling without including glass in the recycling bin. As another example, a recycling score may then be a function of the frequency of recycling or the amount of recycling without any contaminants. As another example, a recycling score may then be an inverse function of the frequency of contaminants within recyclables.

A recycling score, for example, may be associated with and/or presented to a user associated with a specific recycling bin to encourage better recycling. For example, a user may be provided with a score along with a statement indicating the recycling score can be improved by changing a specific behavior of the user related to recycling. A recycling score, for example, may be associated with and/or presented to a neighborhood and/or city.

A contamination score, for example, may be the inverse of recycling score.

In some embodiments, the recyclable dataset may be used for composition analysis 225. The composition analysis may determine the composition of the recyclables found within a given bin. The composition analysis may identify the composition of a given bin or the composition of a given bin or a given location over time.

In some embodiments, the recyclable dataset may be used for route optimization 230. The recyclable dataset may inform future truck routes such as, for example, to collect bins that historically include recyclables of similar composition during a given truck route, to collect bins that historically include recyclables with or without contaminants during a given truck route, to collect bins that historically include recyclables that can processed at one facility and collect bins that include recyclables that can be processed at another facility, etc.

Route optimization may also occur in real time. For example, if a truck receives a more than a threshold number of contaminants or more than a threshold number of contaminants of a particular kind, the truck may be routed to a specific processing facility or routed to a landfill.

In some embodiments, the recyclable dataset may be used for product identification 235.

Figure 3:
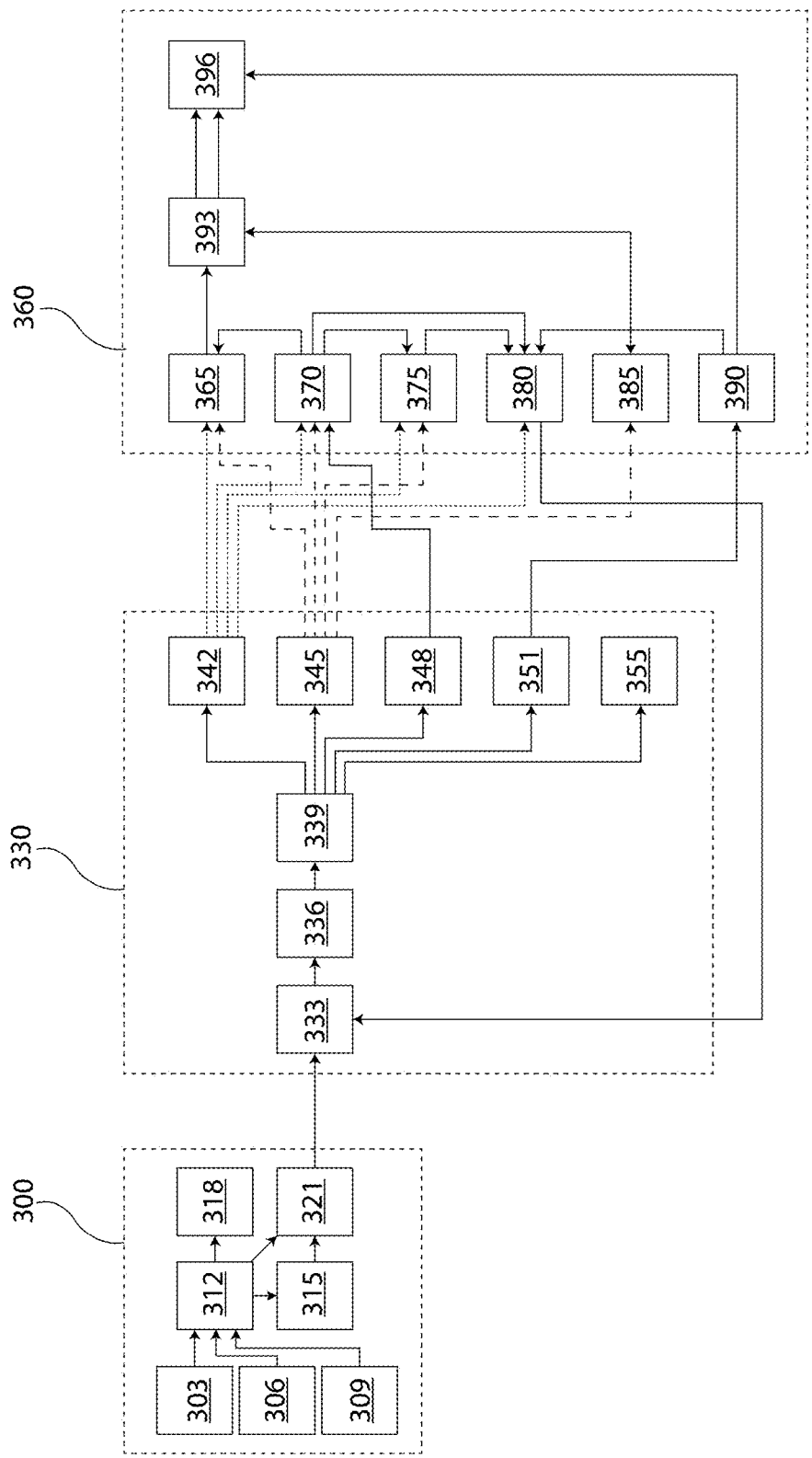
FIG. 3 is an example block diagram of a sensor system, a cloud processor, and end users.

FIG. 3 is a block diagram of an example control system 300, an example cloud processor 330, and example end users 360 according to some embodiments. The control system 300, for example, may include one or most of the components of collection vehicle 100. The cloud processor 330, for example, may include one or more of the components of cloud processor 200.

The control system 300, for example, may be located on a recycling truck. The control system 300, for example, may include a camera 303, an RFID sensor 306, and/or a GPS device 309 that may input data (collectively "sensors").

The data may be received from the sensors by the controller 312. The controller 312 may include all or part of the components and/or functionality of controller 135. The controller 312 may store the data from the sensors in digital storage 318 in raw, filtered, formatted, revised, etc. versions.

Block 315 may represent frame selection, which may occur by the controller 312 or by a separate component or device. The frame selection may select one or more frames of image data from the camera 303 based on a number of factors (e.g., those factors described in this document). The selected frame(s), for example, may include the best frame (s) for making object detection or classification decisions. The data, including the selected frame(s) may be communicated to a cloud processor 330 via transceiver 321. The 321//may include any type of wireless transmitter or transceiver such as, for example, those discussed within this document.

The cloud processor 330 may include one or more processors in a single location or distributed remotely. The cloud processor 330 may include all or some of the components and/or the functionality of cloud processor 200. The cloud processor 330 may perform various operations on the data received from the control system 300.

At object detection block 333 object detection may occur within the cloud processor 330 on one or more frames of image data. Object detection, for example, may include all the functionality as described with object detection process 205, block 425, block 458, block 635, block 735, block 815, block 935 and/or elsewhere in this document.

At classification block 336 object classification may occur within the cloud processor 330 on one or more frames of image data with objects detected. Object classification block 336, for example, may include all the functionality as described with object classification process 210, block 430, block 465, block 635, block 740, block 820, block 940 and/or elsewhere in this document.

The data or portions of the data, the object detection data, and object classification data, for example, may be stored in a dataset 339. The dataset 339, for example, may include a novel dataset, a relational dataset, etc.

The data from the dataset 339, for example, may be used for various types of data analysis. This data analysis, for example, may include contamination detection 342, composition analysis 345, route optimization 348, product identification 351, and/or other analysis 355.

The cloud processor 330, for example, may also compress the images and/or store the images for later processing. The cloud processor 330, for example, may also perform various machine learning techniques on the images that can be used to improve the object recognition and/or object classification rules.

The end users 360, for example, may include a material recovery facility (MRF) operators 365, collection operators 370, municipalities 375, consumers 380, recovery marketplaces 385, product marketing 390, recyclers 393, manufactures 396, etc.

The MRF operators 365, for example, may receive contamination data from the contamination detection 342 and/or composition analysis data from the composition analysis 345. The MRF operators 365, for example, may use this data for presorting purposes.

The collection operators 370, for example, may receive contamination data from the contamination detection 342, composition analysis data from the composition analysis 345, and/or route optimization data from the route optimization 348.

The municipalities 375, for example, may receive contamination data from the contamination detection 342 and/or composition analysis data from the composition analysis 345. The municipalities 375, for example, may use this data for consumer education, city planning, etc. The municipalities 375, for example, may use this data for fines or incentives of citizens based on their participation in recycling.

One or more consumers 360, for example, may receive contamination data from the contamination detection 342. Consumers 360 may use this data, for example, for education purposes to aid in decreasing contamination in future bins.

A recovery marketplace 385, for example, may use the data to provide value estimates for a lot of recyclables.

The data, for example, may be used for product marketing 390. Product marketing, for example, may, for example, emphasize that a certain recyclable has a higher or lower percentage of recycling than another product. As another example, marketing may change marketing tactics for products with a low recycling rate to encourage a higher recycling rate.

Figure 4A:
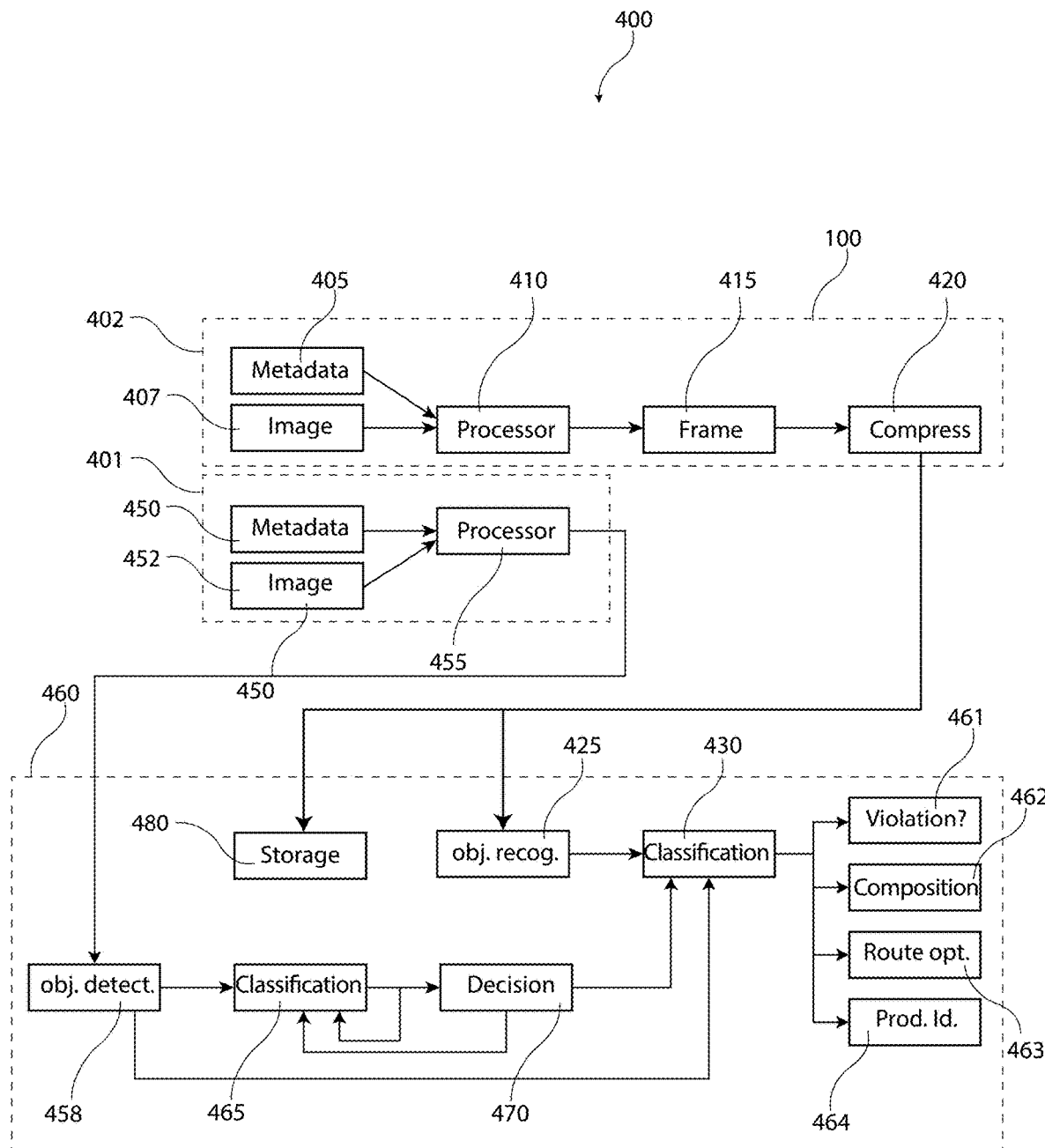
FIG. 4A is an example flowchart of a process for identifying and classifying recyclables and/or green waste.

FIG. 4A is a flowchart of a process 400 for identifying and classifying recyclables according to some embodiments. The process 400 may include data collected from a user via a mobile device 401 and/or data collected from a collection vehicle 402.

Metadata 405 can be combined with image data 407 at the processor 410 on the collection vehicle 402. The image data 407, for example, may be sensed by an optical sensor on the collection vehicle 402. The metadata 405, for example, can include GPS data, bin ID data, etc. As another example, the metadata 405 may also include proximity data, metal detection data, collection date, collection time, historical contamination data, vehicle (or truck) systems data, imaging system data, weather data, temperature, humidity, ambient light, atmospheric pressure, etc.

At block 415, the process 400 may select one or more frames from a video and/or select one or more images from a plurality of images. The selected frame may include a frame that includes a plurality of recyclables, has good contrast, has good lighting, well-defined objects, sharp focus, high number of objects, etc. In some embodiments, a plurality of frames may be selected. This may occur on the collection vehicle 402 or in the cloud.

At block 420, the frame and/or the metadata may be compressed. This may occur on the collection vehicle 402. Before or after compression the data may be transferred to the cloud processor 460. The cloud processor 460 may include all or some of the components and/or all or some of the components of cloud processor 200.

At block 425, object detection may occur. Various object detection techniques may be used, such as, for example, any of the object detection techniques discussed above. The object detection may occur in the cloud. This image with object detection data may be fed into block 430 for object classification. Each identified object from block 425 may be classified at block 430 into object types, object descriptors, etc.

A user with a mobile device 401 may also take pictures of recyclables placed within a bin prior to placing the bin in a place to be collected by the collection vehicle. The images 450 collected with the mobile device 401 may be combined with metadata 452 at the processor 455 on the mobile device 401. The metadata 452, for example, may include GPS data and/or a user ID such as, for example, a user account number, a user address, a user email address, a username, etc.

This image combined with the metadata may be fed into block 458 for object detection within the cloud processor 460. This may or may not occur before or after compressing the image at block 420. Compression may allow the collection vehicle 100 to send a compressed image to the cloud processor 460 using less bandwidth.

At block 458, object detection may occur. Various object detection techniques may be used, such as, for example, any of the object detection techniques discussed above. The object detection may occur in the cloud. This image with object detection data may be fed into block 430 for object classification. Each identified object from block 458 may be classified at block 465 into object types, object descriptors, etc.

At block 470, a decision service may be used to train the object classification process at block 465. The decision service may allow a user to view an identified object and identify wither the object was improperly or properly classify (e.g., label) or confirm that a classified object is properly classified.

At block 430, object detection data from block 425 and/or from block 458 may be classified. This data may be classified based on the classification data provided by block 470.

The classified object data and the metadata may be used for a number of purposes. For example, the classified object data and the metadata may be used for violation detection 461. Violation detection 461 may determine whether any violations or contaminations are within the recyclables. As another example, the classified object data and the metadata may be used for composition analysis 462, which may, for example, determine the composition of the various objects. The composition analysis may inform a recycling center about the source of different types of materials and how to process them As another example, the classified object data and the metadata may be used for route optimization 463 of the collection vehicle, for example, based on the number and/or type of recyclables. As another example, the classified object data and the metadata may be used for product identification 464, which may, for example, be used to determine whether a certain type of product is more or less likely to be recycled.

Images received from the collection vehicle 100, for example, may be stored in storage 480 by the cloud processor 460. The images may be compressed prior to being stored in storage 480.

Figure 4B:
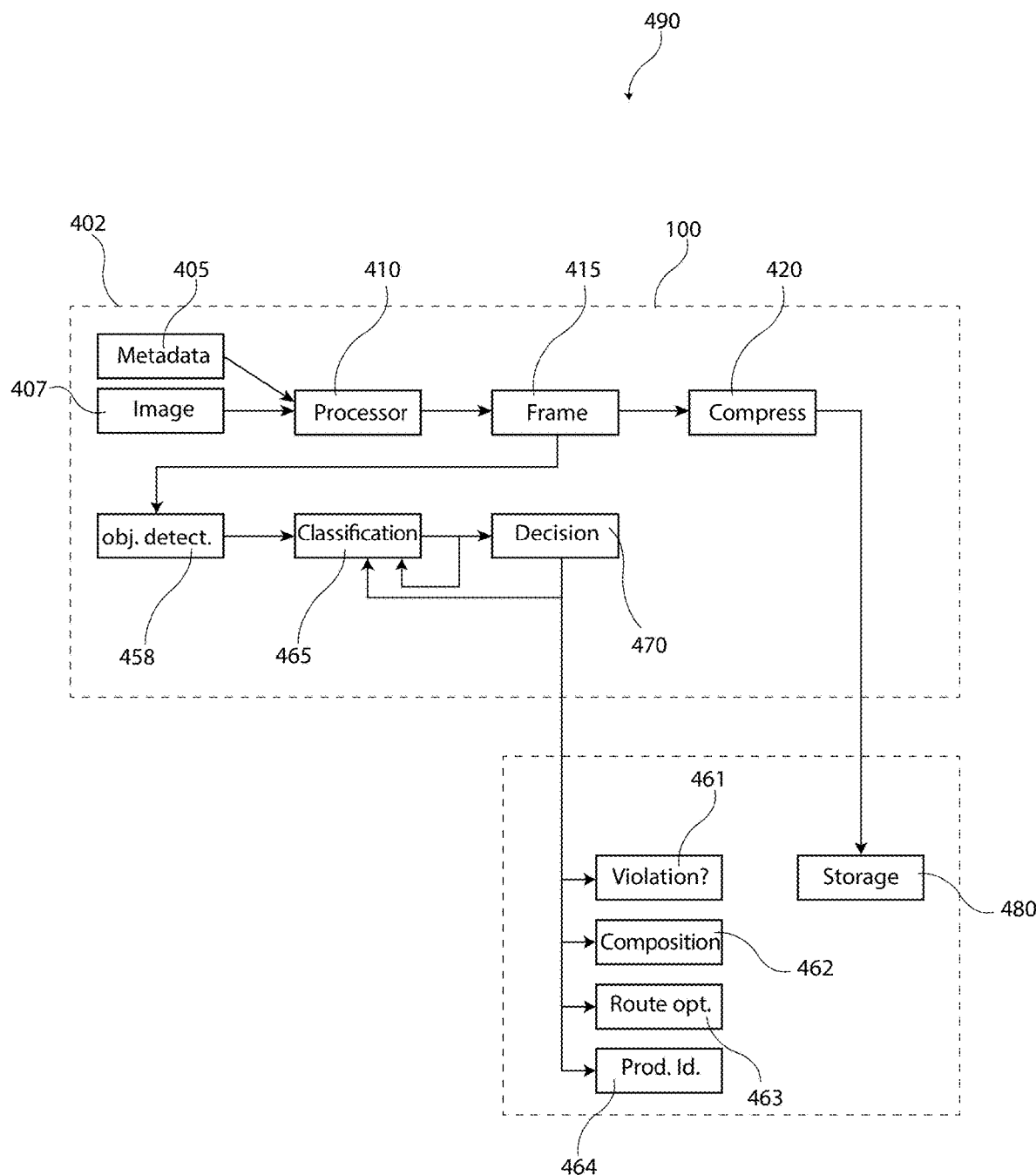
FIG. 4B is an example flowchart of a process for identifying and classifying recyclables and/or green waste.

FIG. 4B is a flowchart of a process 490 for identifying and classifying recyclables on a collection vehicle 100 according to some embodiments. Process 490 includes blocks 405, 407, 410, 415, and 420 as described above. Blocks 458, 465, and 470, which were previously described in process 400 as occurring at the cloud process 460, occur at the collection vehicle 100 in process 490. Block 458 and/or block 465, for example, in process 490, may proceed with a non-compressed image. Alternatively or additionally, block 458 and/or block 465, for example, in process 490, may proceed with or without a compressed image.

In process 490, for example, violation detection 461, composition analysis 462, route optimization 463, and/or product identification 464, as described above, may occur at the cloud processor 460. Alternatively or additionally, all of or portions of composition detection 461, composition analysis 462, route optimization 463, and/or product identification 464, for example, may occur at the collection vehicle 100. Alternatively or additionally, portions of composition detection 461, composition analysis 462, route optimization 463, and/or product identification 464, for example, may occur at the collection vehicle 100 and at the cloud processor 460.

Figure 5:
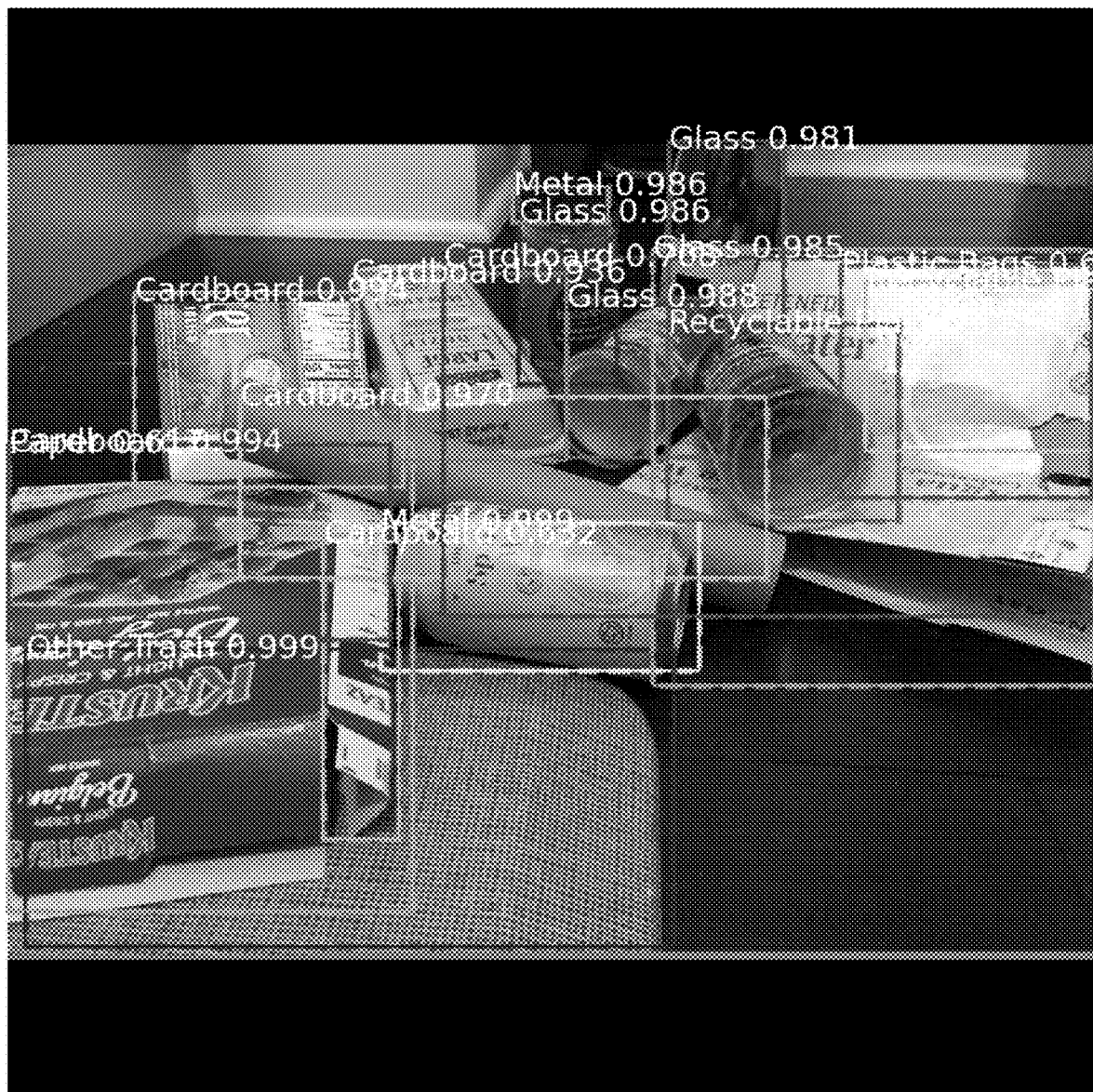
FIG. 5 shows an example image with objects identified and classified.

FIG. 5 shows an example image with objects identified and classified. In this example, objects are identified with boxes. In this example, the boxed items are then classified as glass, paper, cardboard, metal, recyclable, etc. In addition, in this example, a classification score or confidence is also shown.

Figure 6:
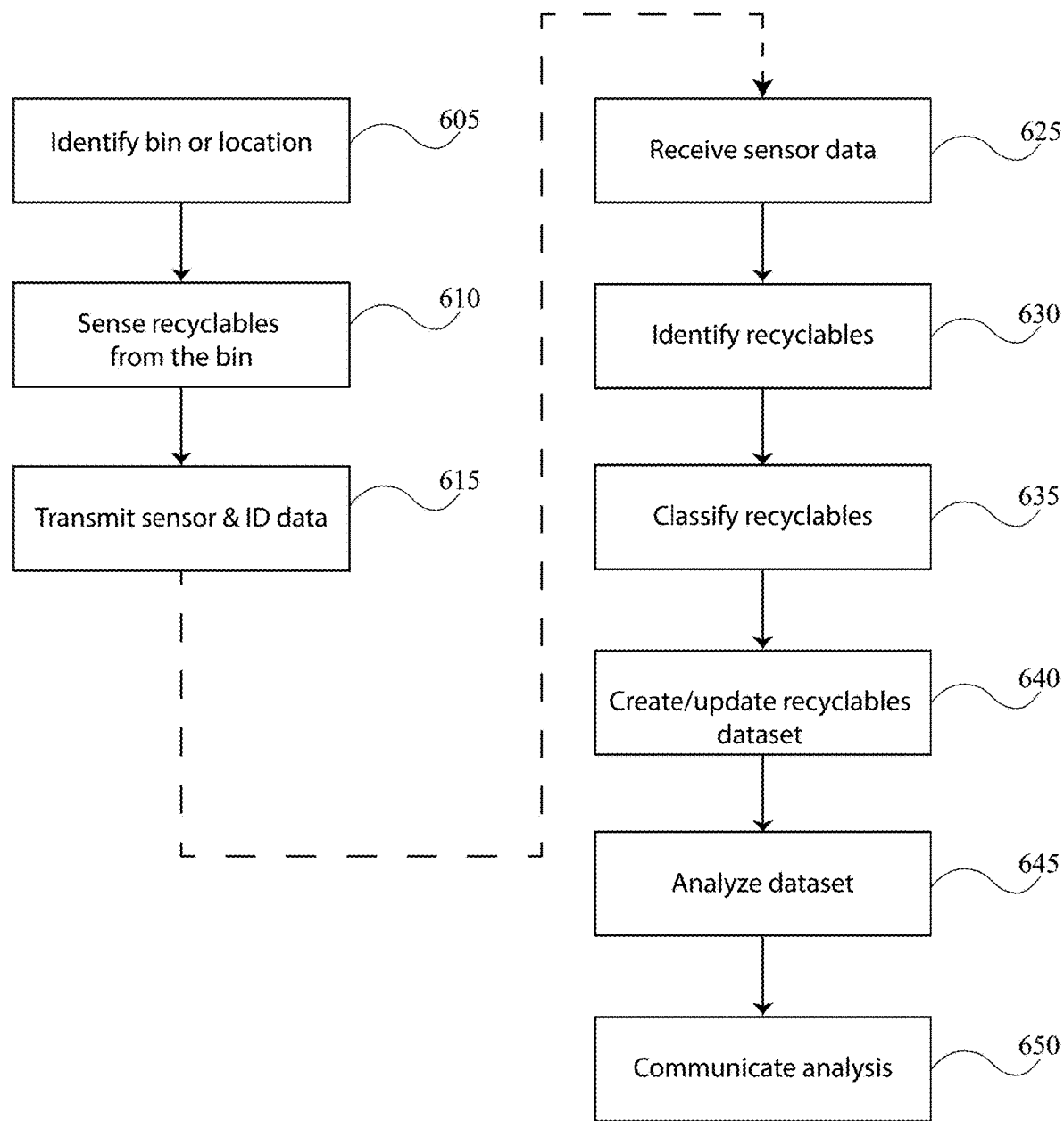
FIG. 6 is an example flowchart of a process for collecting and processing recyclable and/or green waste.

FIG. 6 is a flowchart of a process 600 for collecting and processing recyclable data according to some embodiments. The blocks of process 600 may occur in part at the recycling truck and at a remote server in the cloud. The process 600 may include one or more additional blocks. The blocks shown in the process 600 may occur in any order and over any period of time. Any of the blocks shown in the process 600 may be removed, replaced, or may occur in any order. Process 600, for example, may be executed by a controller on the collection vehicle 100 on a recycling truck and/or in the cloud.

The process 600 may start at block 605. Block 605 may occur on a recycling truck. At block 605 a bin and/or the location of a bin that is being picked up by a recycling truck may be identified. For example, the location may be identified using a GPS signal or reading an address or other indicator from a curb, house, building, etc. As another example, a bin can be identified by reading characters, code, or QR code on the bin with a camera. The bin can be identified, for example, by reading an RFID chip embedded within or coupled with the bin. The bin identifier and/or the location may be recorded as bin ID data.

At block 610, the recyclables may be sensed. The recyclables may be sensed, for example, using the optical sensor 105, the metal detector 110, and/or the proximity sensor 115. One or more images or videos of the recyclables may be recorded. The sensor data and the ID data, for example, may be associated together prior to block 615 to include sensor data and ID data associated with a given bin.

At block 615, the sensor data and ID data may be transmitted from the recycling truck such as, for example, via a wireless communication channel. The transceiver 145 may be used to transmit the sensor data and ID data.

At block 625 the sensor data and ID data may be received at a cloud processor.

At block 630 the recyclables sensed by the sensors at the recycling truck may be identified, for example, as described in conjunction with object detection process 205.

At block 635 the recyclables may be classified. The recyclables may be classified, for example, as described in conjunction with object classification process 210.

At block 640 a recyclables dataset may be created and/or updated with the identified and/or classified recyclables data and/or the ID data. The recyclables dataset may be a dataset for recyclables related to a given bin collected over a period of time. The bin may be associated with geographic data, address data, etc. For example, the recyclable dataset may for each object in an image include two points defining two corners of a rectangle surrounding each object, an object type, an object classification confidence score, a contamination rate, etc.

At block 645 the recyclables dataset may be analyzed. The analysis may, for example, include contamination detection, composition analysis, route optimization, product identification, etc.

At block 650 the analysis may be communicated. Contamination detection data, for example, may be communicated to the MRF operator where recycling truck is taking the recyclables, the collection operator coordinating the truck, the municipality where the bin is located, the owner of the bin, etc. Composition analysis data, for example, may be communicated to the MRF operator where recycling truck is taking the recyclables, the collection operator coordinating the truck, the municipality where the bin is located, a recyclable marketplace, etc. Route optimization data, for example, may be communicated to the collection operator coordinating the truck. Product identification data, for example, may be collated and used for product marketing purposes.

The recycling truck may continue to collect ID data from bins and collect sensor data from recyclables collected from the bins at different locations at block 605 and block 610 and transmit the sensor and ID data to the cloud.

Figure 7:
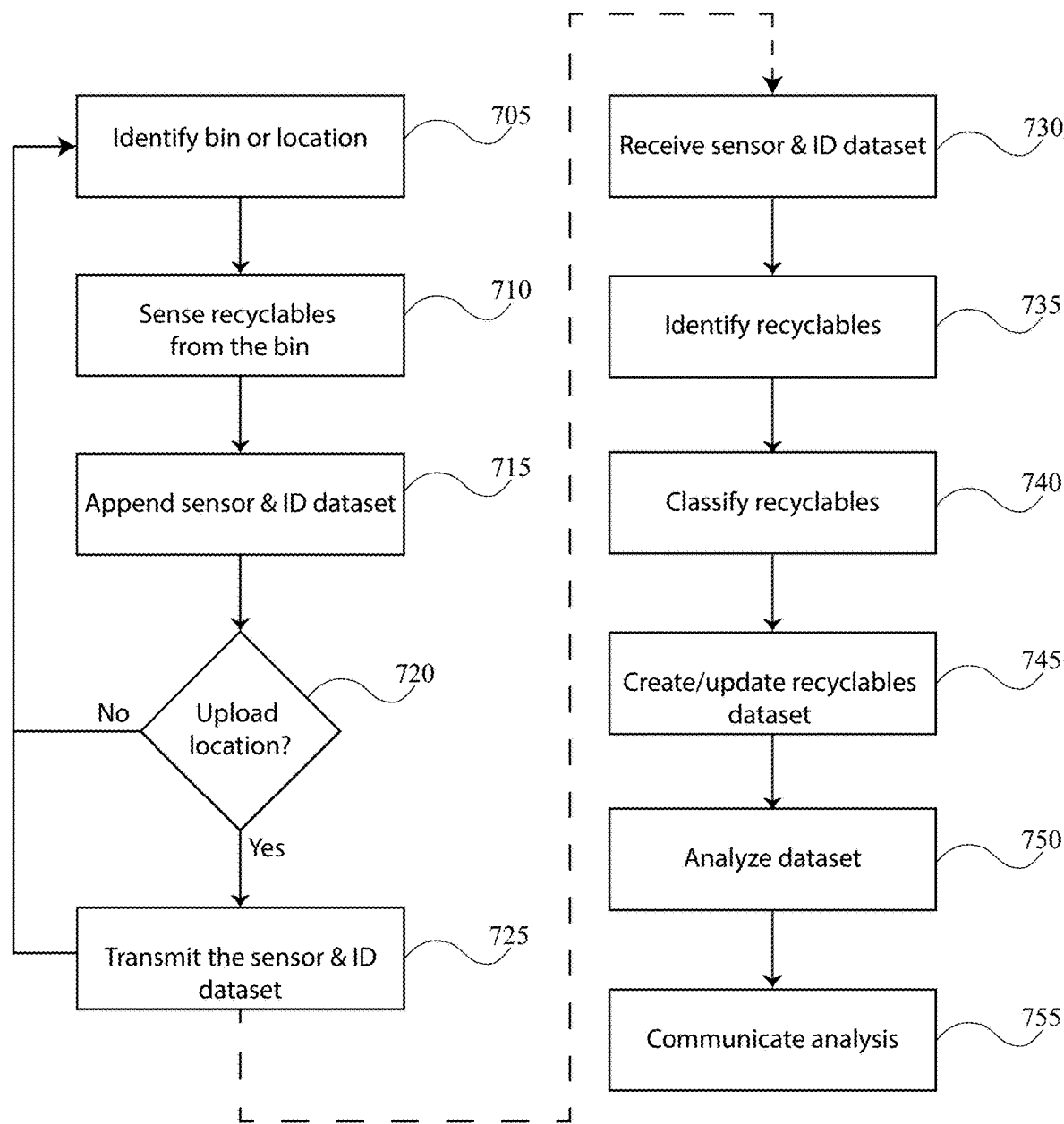
FIG. 7 is an example flowchart of a process for collecting and processing recyclable and/or green waste.

FIG. 7 is a flowchart of a process 700 for collecting and processing recyclable data according to some embodiments. The blocks of process 700 may occur in part at the recycling truck and at a remote server in the cloud. The blocks shown in the process 700 may occur in any order and over any period of time. Any of the blocks shown in the process 700 may be removed, replaced, or may occur in any order. Process 700, for example, may be executed by a controller on the collection vehicle 100 on a recycling truck and/or in the cloud.

The process 700 may start with block 705, which is similar to block 605 of process 600 and proceed to block 710, which is similar to block 610 of process 600.

At block 715 sensor and ID dataset may be appended. The sensor and ID dataset may include sensor and ID data from a plurality of bins collected by the recycling truck. The recycling truck may not transmit the sensor and ID dataset until the recycling truck is within an upload location.

At block 720, it can be determined whether the recycling truck is within an upload location based. The recycling truck may determine whether it's within an upload location, for example, based on GPS data collected, for example, by GPS sensor 125. As another example, the recycling truck may determine whether the recycling truck is within an upload location, for example, based whether a wireless transmitter of the recycling truck is within range of a wireless signal such as, for example, a Wi-Fi router or any other high speed connection If the recycling truck is not within an upload location, the process 700 returns to block 705 and recycling truck continues to collect bins at different locations. If the recycling truck is within an upload location, the process 700 proceeds to block 725.

At block 725, the sensor and ID dataset from multiple bins can be transmitted from the recycling truck to the cloud such as, for example, via a wireless communication channel. The transceiver 145 may be used to transmit the sensor data and ID data.

At block 730 the sensor and ID dataset can be received at the cloud.

At block 735 the recyclables sensed by the sensors at the recycling truck for each bin may be identified, for example, as described in conjunction with object detection process 205.

At block 740 the recyclables identified in block 735 for each bin may be classified. The recyclables may be classified, for example, as described in conjunction with object classification process 210.

At block 745 a recyclable dataset may be created and/or updated with the identified and/or classified recyclables data and/or the ID data. The recyclables dataset may be a dataset for recyclables related to a given bin collected over a period of time.

At block 750 the dataset may be analyzed such as, for example, as discussed in block 645 of process 600. At block 755 the analysis may be communicated such as, for example, as discussed in block 650 of process 600.

Figure 8:
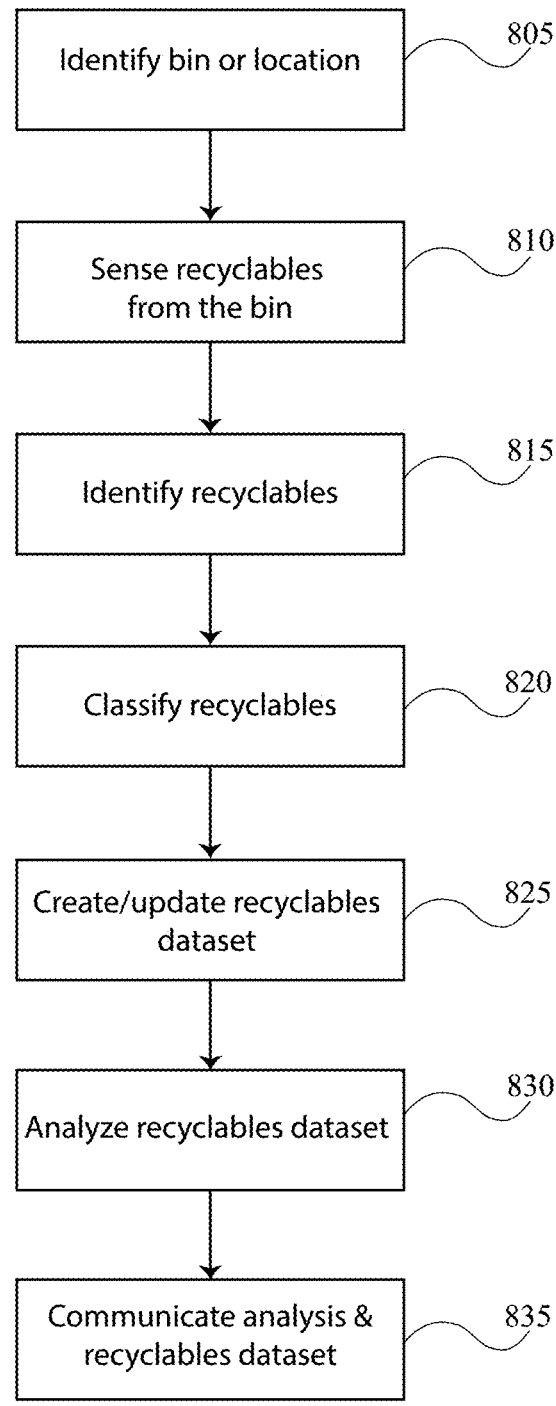
FIG. 8 is an example flowchart of a process for collecting and processing recyclable and/or green waste.

FIG. 8 is a flowchart of a process 800 for collecting and processing recyclable data according to some embodiments. The blocks of process 800 may occur at the recycling truck. The process 700 may include one or more additional blocks. The blocks shown in the process 800 may occur in any order and over any period of time. Any of the blocks shown in the process 800 may be removed, replaced, or may occur in any order. Process 800, for example, may be executed by a controller on the collection vehicle 100 on a recycling truck and/or in the cloud.

The process 800 may start with block 805, which is similar to block 605 of process 600 and proceed to block 810, which is similar to block 610 of process 600.

At block 815 the recyclables sensed in block 810 may be identified at a processor on the recycling truck, for example, as described in conjunction with object detection process 205.

At block 820 the recyclables identified in block 815 for each bin may be classified at a controller at the recycling truck. The recyclables may be classified, for example, as described in conjunction with object classification process 210.

At block 825 a recyclables dataset may be created for a given bin based on the identification and classification of block 815 and block 820 such as, for example, as described in conjunction with block 640 of process 600.

At block 830 the recyclables dataset may be analyzed such as, for example, as described in conjunction with block 645 of process 600. And at block 835 the analysis and/or the dataset may be communicated as described above such as, for example, in block 655.

At block 830 the analysis and/or the recyclables dataset may be communicated to a third party and/or to the cloud. For example, the analysis may be communicated to the cloud such as, for example, as described in conjunction with block 650 of process 600. The recyclables dataset may be transmitted to the cloud such as, for example, for further analysis, data storage, processing, etc.

Figure 9:
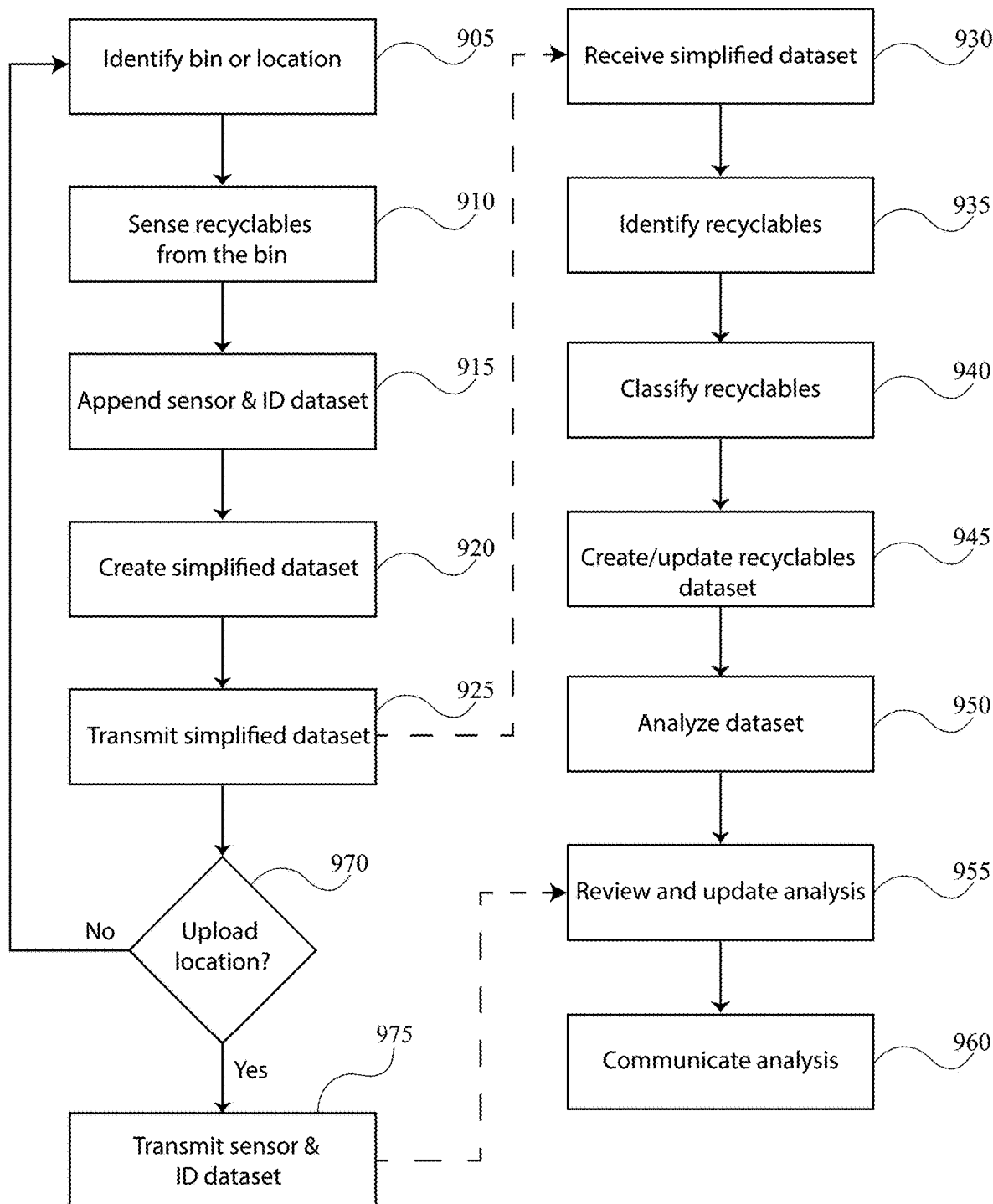
FIG. 9 is an example flowchart of a process for collecting and processing recyclable and/or green waste.

FIG. 9 is a flowchart of a process 900 for collecting and processing recyclable data according to some embodiments. The blocks of process 900 may occur in part at the recycling truck and at a remote server in the cloud. The blocks shown in the process 900 may occur in any order and over any period of time. Any of the blocks shown in the process 900 may be removed, replaced, or may occur in any order. The process 900, for example, may be executed by a controller on the collection vehicle 100 on a recycling truck and/or in the cloud.

The process 900 may start with block 905, which is similar to block 605 of process 600 and proceed to block 910, which is similar to block 610 of process 600.

At block 915 sensor and ID dataset may be appended such as, for example, as described in conjunction with block 715 of process 700. The sensor and ID dataset, for example, may include sensor and ID data from a plurality of bins collected by the recycling truck.

At block 920 a simplified dataset may be created. The simplified dataset, for example, may select one or more frames from a video and/or select one or more images from a plurality of images. These images may, for example, be selected based on contrast, focus, sharpness, number of recyclables in a field of view, etc. Block 920 may be similar to block 425 of process 400.

At block 925 the simplified dataset and/or ID may be transmitted to the cloud. After block 925 the process 900 may bifurcate by proceeding to both block 970 and block 930.

At block 970 it can be determined whether the recycling truck is within an upload location based. The recycling truck may determine whether it's within an upload location, for example, based on GPS data collected, for example, by GPS sensor 125. As another example, the recycling truck may determine whether the recycling truck is within an upload location, for example, based whether a wireless transmitter of the recycling truck is within range of a wireless signal such as, for example, a wife router.

If the recycling truck is not within an upload location, the process 900 returns to block 905 and the recycling truck continues to collect bins at different locations and sensor and ID data is collected. If the recycling truck is within an upload location, the process 900 proceeds to block 975.

At block 975, the sensor and ID dataset from multiple bins can be transmitted from the recycling truck to the cloud such as, for example, via a wireless communication channel. The transceiver 145 may be used to transmit the sensor data and ID data.

At block 930, the simplified dataset may be received in the cloud.

At block 935 recyclables may be identified from the reduced dataset in the cloud, for example, as described in conjunction with object detection process 205.

At block 940 recyclables may be classified, for example, as described in conjunction with object detection process 210.

At block 945 a recyclables dataset may be created for a given bin based on the identification and classification of block 935 and block 940 such as, for example, as described in conjunction with block 640 of process 600.

At block 950 the recyclables dataset may be analyzed such as, for example, as described in conjunction with block 645 of process 600. At block 950, the analysis may, for example, include an analysis that requires short term decision making such as, for example, contaminant detection, composition analysis, and/or route optimization. Analysis that may benefit from having more data may occur, for example, after receiving the full sensor dataset that is received at block 955.

At block 955 sensor data and ID data from multiple bins may be received from the recycling truck and the analysis performed at block 950 may be updated and/or revised based on the full dataset.

At block 960 the analysis from either or both block 950 or block 955 may be communicated.

The computational system 1000, shown in FIG. 10 can be used to perform any of the embodiments of the invention. For example, computational system 1000 can be used to execute various portions of processes described above. As another example, computational system 1000 can perform any calculation, identification and/or determination described here. Computational system 1000 includes hardware elements that can be electrically coupled via a bus 1002 (or may otherwise be in communication, as appropriate). The hardware elements can include one or more graphics processing units (GPU) 1005; one or more processors 1010, including without limitation one or more general-purpose processors and/or one or more special-purpose processors (such as digital signal processing chips, graphics acceleration chips, and/or the like); one or more input devices 1015, which can include without limitation a mouse, a keyboard and/or the like; and one or more output devices 1020, which can include without limitation a display device, a printer and/or the like.

The computational system 1000 may further include (and/or be in communication with) one or more storage devices 1025, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 1000 might also include a communications subsystem 1030, which can include without limitation a modem, a network card (wireless or wired), an infrared communication device, a wireless communication device and/or chipset (such as a Bluetooth device, an 802.6 device, a Wi-Fi device, a WiMax device, cellular communication facilities, etc.), LTE, 4G, 5G, and/or the like. The communications subsystem 1030 may permit data to be exchanged with a network (such as the network described below, to name one example), and/or any other devices described in this document. In many embodiments, the computational system 1000 will further include a working memory 1035, which can include a RAM or ROM device, as described above.

The computational system 1000 also can include software elements, shown as being currently located within the working memory 1035, including an operating system 1040 and/or other code, such as one or more application programs 1045, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1025 described above.

In some cases, the storage medium might be incorporated within the computational system 1000 or in communication with the computational system 1000. In other embodiments, the storage medium might be separate from a computational system 1000 (e.g., a removable medium or via a network), and/or provided in an installation package, such that the storage medium can be used to program a general-purpose computer with the instructions/code stored thereon. These instructions might take the form of executable code, which is executable by the computational system 1000 and/or might take the form of source and/or installable code, which, upon compilation and/or installation on the computational system 1000 (e.g., using any of a variety of generally available compilers, installation programs, compression/decompression utilities, etc.) then takes the form of executable code.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

The terms "first", "second", "third", etc. are used to distinguish respective elements and are not used to denote a particular order of those elements unless otherwise specified or order is explicitly described or required.

Numerous specific details are set forth to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained in software to be used in programming or configuring a computing device.

Embodiments of the methods disclosed may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments.

Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A recyclable identification system comprising:
an imaging system configured to be disposed on a collection vehicle to image objects as the objects pass from a bin into a container of the collection vehicle;
a camera configured to be disposed on a collection vehicle that images at least a portion of the bin having a bin identifier;
a GPS sensor;
a transceiver; and
a controller communicatively coupled with the imaging system, the camera, the GPS sensor, and the transceiver, the controller:
receives a plurality of images from the imaging system, the plurality of images includes images of objects as they are being dumped into the container;
determines a bin identifier from images from the camera;
receives GPS data from the GPS sensor;
combines the plurality of images with the bin identifier and the GPS data;
transmits the plurality of images, the GPS data, and the bin identifier to a cloud computing system via the transceiver.

2. The system according to claim 1, wherein the plurality of images comprises a video.

3. The system according to claim 1, further comprising one or more flow control subsystems that physically controls a flow of objects as they are dumped into the container.

4. The system according to claim 1, further comprising a proximity sensor or metal detector communicatively coupled with the controller.

5. The system according to claim 4, wherein the proximity sensor provides 3D data and/or optical data associated with the objects imaged by the imaging system.

6. The system according to claim 1, wherein the controller selects a subset of the plurality of images that include images of recyclables based on at least one or more image characteristics selected from a list consisting of image focus, the number of recyclables in an image, image contrast, image brightness, image color, and image sharpness.

7. A method comprising:
receiving a plurality of images of recyclables, GPS data, and a bin identifier from a recyclable collection vehicle having a container, wherein the plurality of images of recyclables include images of objects that have been dumped into the container of the recyclable collection vehicle;
receiving a bin identifier collected from a camera at the recyclable collection vehicle;
determining a location based on the GPS data;
combining the plurality of images of recyclables with the bin identifier and the location;
identifying distinct objects within the plurality of images of recyclables; and
classifying the distinct objects as an object selected from a list consisting of metal, cardboard, paper products, glass, garbage, food, contaminants, electronic devices, battery, wood, plastic, green waste, and cloth.

8. The method according to claim 7, wherein classifying the distinct objects as a plastic further comprises classifying the plastic as a PET, HDPE, PVC, LDPE, PP or PS.

9. The method according to claim 7, wherein classifying the distinct objects as a metal further comprises classifying the metal as aluminum, tin, ferrous metals, copper, gold, or silver.

10. The method according to claim 7, further comprising detecting contamination within the distinct objects based on the classification of the distinct objects.

11. The method according to claim 7, further comprising determining a composition of recyclables within the distinct objects based on the classification of the distinct objects.

12. The method according to claim 7, further comprising determining a future route for the collection vehicle based at least in part on the classification of the distinct objects.

13. The method according to claim 7, wherein the classifying the distinct objects includes using a machine learning algorithm.

14. The method according to claim 7, wherein identifying distinct objects within the image of recyclables includes detecting edges within the one or more images based on gradients or matrices.

15. The method according to claim 7, wherein identifying distinct objects within the image of recyclables includes using a region of interest alignment process.

16. The method according to claim 7, wherein identifying distinct objects within the image of recyclables includes drawing a bounding box around identified objects.

17. A method comprising:
receiving a plurality of images from an imaging system positioned on a collection vehicle in such a way to collect a plurality of images of objects as the objects pass from a bin into a container of the collection vehicle;
determining a bin identifier from images taken by a camera positioned on the collection vehicle to image a bin;
receiving GPS data from the GPS sensor;
combining the plurality of images of the objects with the bin identifier and the GPS data;
transmitting the plurality of images of the objects, the GPS data, and the bin identifier to a cloud computing system via a transceiver.

18. A method comprising:
receiving a plurality of images from an imaging system positioned on a collection vehicle in such a way to collect a plurality of images of objects as the objects pass from a bin into a container of the collection vehicle;
determining a location associated with one or more of the plurality of images;
identifying the boundaries of distinct objects within one or more selected images; and
classifying the distinct objects in the one or more selected images as either a contaminant or green waste.

19. The method according to claim 18, wherein determining a location associated with one or more of the plurality of images is determined based on image metadata.

* * * * *